US012531037B2

(12) United States Patent
Lessem

(10) Patent No.: US 12,531,037 B2
(45) Date of Patent: Jan. 20, 2026

(54) ACOUSTICAL STRINGED INSTRUMENT

(71) Applicant: Jonathan Jess Lessem, Baltimore, MD (US)

(72) Inventor: Jonathan Jess Lessem, Baltimore, MD (US)

( * ) Notice: Subject to any disclaimer, the term of this patent is extended or adjusted under 35 U.S.C. 154(b) by 402 days.

(21) Appl. No.: 18/095,682

(22) Filed: Jan. 11, 2023

(65) Prior Publication Data

US 2024/0233685 A1 Jul. 11, 2024

(51) Int. Cl.

| | |
|---|---|
| ***G10D 3/14*** | (2020.01) |
| ***G10D 1/08*** | (2006.01) |
| ***G10D 3/02*** | (2006.01) |
| ***G10D 3/04*** | (2020.01) |
| ***G10D 3/06*** | (2020.01) |
| ***G10D 3/10*** | (2006.01) |

(52) U.S. Cl.
CPC ................. *G10D 3/02* (2013.01); *G10D 1/08* (2013.01); *G10D 3/04* (2013.01); *G10D 3/06* (2013.01); *G10D 3/10* (2013.01); *G10D 3/14* (2013.01)

(58) Field of Classification Search
CPC .. G10D 3/02; G10D 1/08; G10D 3/04; G10D 3/06; G10D 3/10; G10D 3/14
See application file for complete search history.

(56) References Cited

U.S. PATENT DOCUMENTS 6,646,191 B1 * 11/2003 Martin ..................... G10D 3/02 84/291

FOREIGN PATENT DOCUMENTS

CN 104575452 A * 4/2015 ............. G10D 1/005

* cited by examiner

*Primary Examiner* — Kimberly R Lockett

(57) ABSTRACT

A stringed musical instrument includes a soundbox, including a soundboard and a backboard opposite the soundboard; a headstock, including tuners; a neck member, including a fretboard, extending between the headstock and the soundbox to form a common longitudinal axis; a plurality of strings having ends coupled to the tuners and other ends coupled to the soundbox; and a bridge coupled to the soundbox along the longitudinal axis. Ends of the strings are connected to the bridge and other ends of the strings are connected to the tuners. The soundboard is configured to directly interconnect with the backboard to form a sound chamber.

17 Claims, 6 Drawing Sheets

ACOUSTICAL STRINGED INSTRUMENT

BACKGROUND

1. Field

The following description relates to an acoustical stringed instrument.

2. Description of Related Art

A conventional guitar or similar stringed instrument is typically configured with a body that functions as a soundbox, with an elongated neck extending therefrom and a plurality of strings attached at one end to the instrument body and the other end to the neck. The string attachment at the neck is typically by means of tuning keys or tuning machines provided at the headstock. The strings then pass over a nut at the base of the headstock and extend along the neck toward the body/soundbox. The lower ends of the strings are attached either directly to a bridge which in turn is mounted on the body, or to a tailpiece provided below the body-mounted bridge, over which the strings extend. Strumming, plucking or otherwise exciting the strings causes them to vibrate, and those vibrations are transferred to the soundbox via the bridge. The front panel of the soundbox acts as a resonant soundboard, with the bridge transferring vibrations from the strings to the soundboard to generate sound from the instrument. The soundbox is traditionally constructed of thin, flat front and back planes, usually of wood or wood composites, connected by undulating thin side walls that provide the traditional hourglass shape of a conventional guitar body.

One disadvantage of conventional soundbox construction with a flat soundboard is the difficulty of that flat surface to resist the eccentric dynamic forces exerted upon it by string tension. A thin soundboard that is not braced would quickly buckle or warp. A soundboard thick enough to withstand the tensile forces without deforming would not vibrate sufficiently, resulting in a thin tone with little volume. To provide a desired strength to resist the string tension forces without deformation, it is customary to provide internal braces to the underside of the soundboard in configurations that help to resolve those tensile forces. However, the braces needed to provide the desired strength may also necessarily diminish the ability of the soundboard to vibrate.

Another disadvantage of conventional soundbox construction is that the typical configuration with a front, back, and sides creates an hourglass-shaped "box" with square edges that can be uncomfortable for some players in some playing positions.

Another disadvantage of conventional soundbox construction is that the neck typically joins the soundbox at the fourteenth fret, while the fretboard and many additional frets continue further towards the bridge by passing on top of the soundboard. This arrangement can make it difficult for a player to reach these lower frets because the soundbox blocks easy access for the player's hand. A traditional solution in some instruments is to "cutaway" a portion of the sound box adjacent to the neck below the $14^{th}$ fret, allowing the player's hand better access to the lower frets. This cutway can typically be provided on only one side of the neck, making the instrument specific to either a left-handed or right-handed player.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a stringed musical instrument includes a soundbox, including a soundboard and a backboard opposite the soundboard; a headstock, including tuners; a neck member, including a fretboard, extending between the headstock and the soundbox to form a common longitudinal axis; a plurality of strings having ends coupled to the tuners and other ends coupled to the soundbox; and a bridge coupled to the soundbox along the longitudinal axis. Ends of the strings are connected to the bridge or to a tailpiece, and other ends of the strings are connected to the tuners. The soundboard is configured to directly interconnect to the backboard to form a sound chamber.

The soundbox may further include one or more soundholes, and the bridge and tuners may reside on or substantially parallel to the longitudinal axis of the neck and soundbox.

Each of the soundboard and the backboard may be configured to have a triangular planar surface with each side of the triangular planar surface having a curved surface extending therefrom.

The shapes of the soundboard and the backboard may be configured to directly interconnect with each other to form a sound chamber.

The soundboard and the backboard may each be formed of materials including but not limited to at least one of solid tonewood, multi-ply laminated wood, resin-impregnated fiberglass fabric, metal, plastic, or any combination thereof.

The soundboard and the backboard may each be formed of a material or multiple materials configured to curve into multiple different axes.

The soundboard and the backboard, or portions thereof, may each be formed of multiple pieces, where each of the multiple pieces of the soundboard and the backboard may have a different material grain orientation with each corresponding with a single axis of curvature.

The soundboard and the backboard, or portions thereof, may each be formed of one or multiple pieces, where the pieces of the soundboard and the backboard are capable of forming or bending in multiple different axes of curvature.

The neck member may be removably connected to the soundbox by a tenon configured to engage a slot in the soundboard and a clip at a heel of the neck member that hooks over an edge of the backboard.

The neck member may be fixedly coupled to the soundbox.

The quantity of strings and tuners may vary in number. Types and arrangements of strings and tuners may vary.

In another general aspect, a stringed musical instrument includes a soundbox, including a soundboard and a backboard opposite the soundboard; a headstock, including tuners; a neck member, including a fretboard, extending between the headstock and the soundbox to form a common longitudinal axis; and a bridge coupled to the soundbox along the longitudinal axis, wherein ends of a plurality of strings are connected to the bridge or tailpiece and other ends of the strings are connected to the tuners. The soundboard is configured to directly connect to the backboard to form a sound chamber, and have a triangular planar surface with sides of the triangular planar surface having curved surfaces extending therefrom into different axes.

The soundboard and the backboard may each be formed of materials including but not limited to any one or any two or more of solid tonewood, multi-ply laminated wood, resin-impregnated fiberglass fabric, metal, plastic, or any combination thereof.

The soundboard and the backboard may each be formed of a material or multiple materials configured to curve into multiple different axes.

The soundboard and the backboard, or portions thereof, may each be formed of multiple pieces, and each of the multiple pieces of the soundboard and the backboard may have a different material grain orientation with each corresponding with a single axis of curvature.

The soundboard and the backboard, or portions thereof, may each be formed of one or multiple pieces, where the pieces of the soundboard and the backboard are capable of forming or bending in multiple different axes of curvature.

The neck member may be removably connected to the soundbox by a tenon configured to engage a slot in the soundboard and a clip at a heel of the neck member that hooks over an edge of the backboard.

The neck member may be fixedly coupled to the soundbox.

The strings may be six in number.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
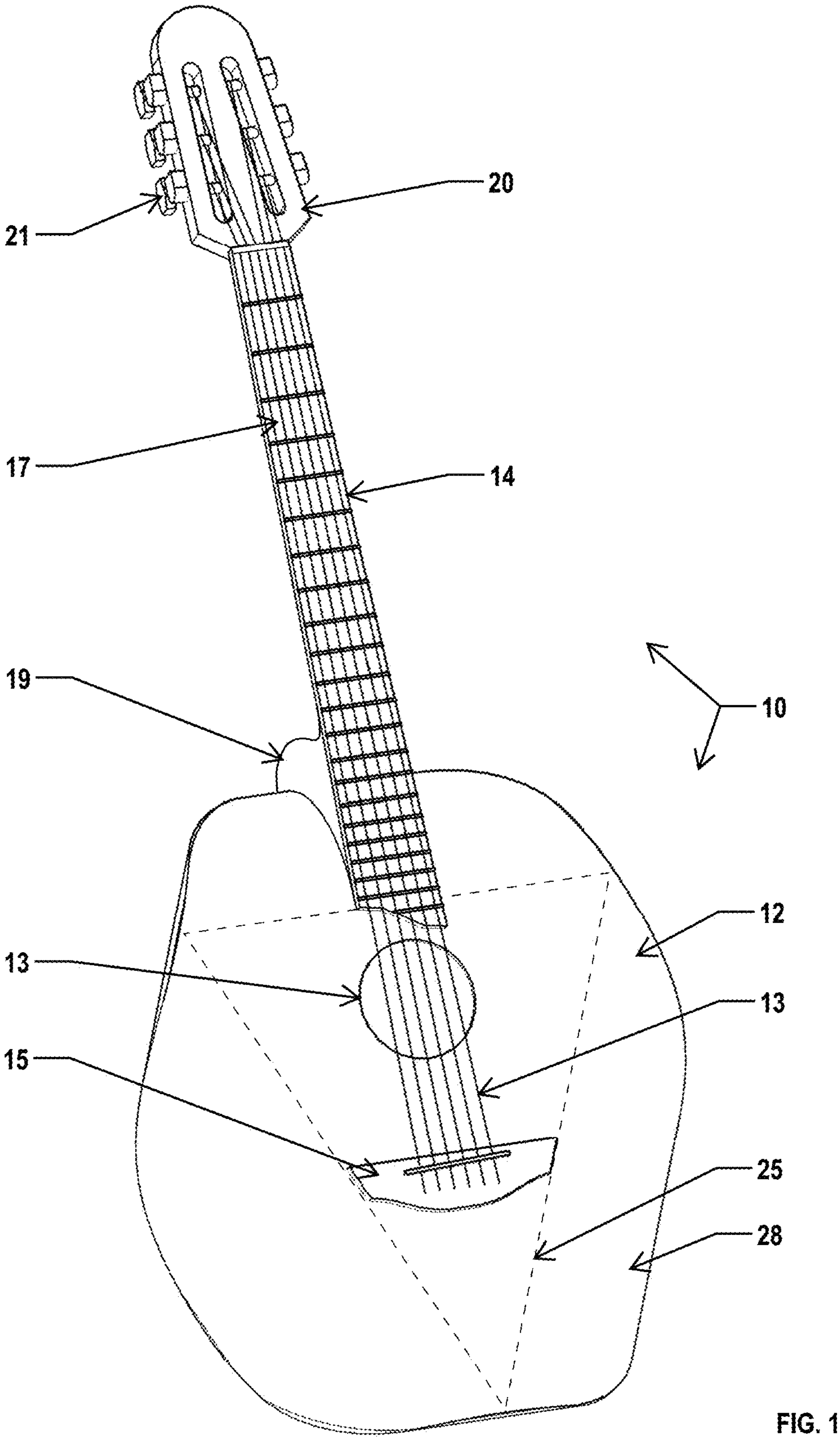
FIG. 1 is a perspective view of an example of a guitar according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways, for example, rotated 90 degrees or at other orientations, and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The present disclosure is presented in the form of a six-string folk-style acoustic guitar, but the concept may be applied to other similar acoustical stringed instruments, as well as other types and styles of guitars.

The present disclosure generally relates to the construction of guitars and other acoustical stringed musical instruments having a neck and soundbox, and to a soundbox construction that features a unique geometric configuration of interconnecting curved shells that significantly reduces the need for internal bracing while allowing thin shell materials.

One or more embodiments of the disclosure utilize an unconventional geometric approach for the construction of the soundbox, featuring a thin soundboard and backboard that are shaped, curved, and interconnected to form the soundbox volume without using side panels. The embodiments take advantage of the curved surfaces to create a structurally self-reinforcing soundbox shape that can resist tensile loads from the strings with minimal internal bracing and can maintain structural integrity with thin wall materials including, but not limited to, solid tonewood, laminated multi-ply wood composites, resin-impregnated glass fiber fabric, or other suitable materials. For example, other suitable materials may include a metal sheet, a plastic sheet, or other flexible or moldable material.

One or more embodiments of the disclosure feature a removable neck but is also compatible with a fixed neck configuration. A bridge may be attached to the face of the soundbox where the strings terminate, but the design is also compatible with a configuration where the strings terminate at a separate tailpiece. The type and number of strings may vary with other embodiments of the disclosure.

Referring now to the drawings, FIG. 1 illustrates an example of a six-string folk-style acoustic guitar 10 having a body or soundbox 12 and a neck member 14, according to one or more embodiments.

The present disclosure utilizes a geometric approach for the construction of the soundbox that features a thin front soundboard 16 and a thin backboard 18 that are shaped, curved, and interconnected to form a volume of the soundbox 12 without the use of side walls. Introducing curvature into a flat plane creates strength along the axis of the curve. Utilizing curved surfaces for the soundboard and the backboard creates a monocoque or stressed-skin structural shell that can resist tensile loads from the strings with minimal internal bracing and can maintain structural integrity with thin materials.

Conventional acoustical guitar construction utilizes flat front and back faces connected by undulating side walls that give guitars their distinctive body shape and form the soundbox volume. The flat front panel cannot typically resist the eccentric tensile forces from the strings without the addition of substantial internal bracing.

The present disclosure introduces curvature to portions of the front soundboard 16 and backboard 18 and interconnects the two curved planes in such a manner that they are able to form a soundbox volume without the use of side panels, and the resulting form can resist the tensile loads from the strings without the need of significant internal bracing. The interconnection of the two curved planes allows each plane to support and reinforce the other at key locations where loads from the neck member and strings are highest.

Figure 2:
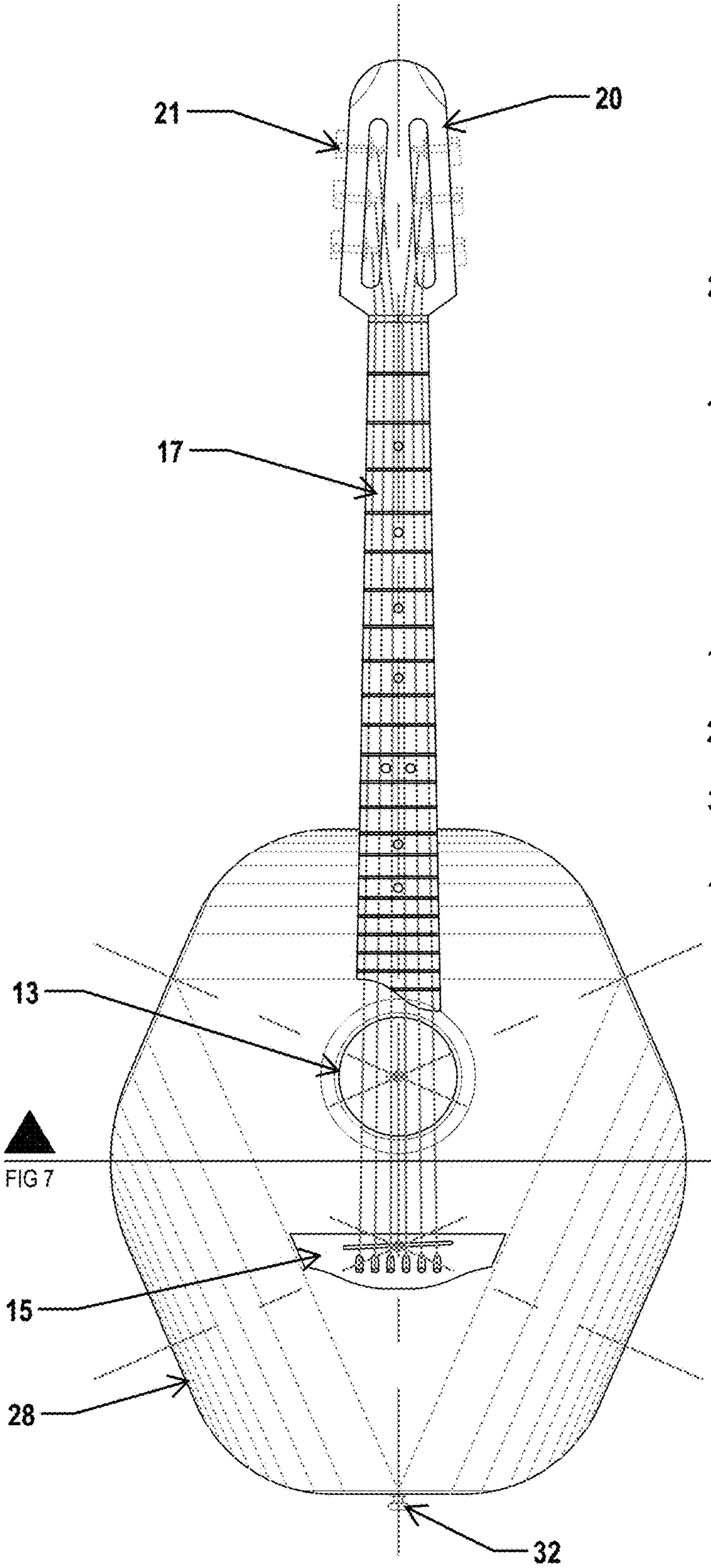
FIG. 2 is a front elevational view of the guitar of FIG. 1.
Figure 3:
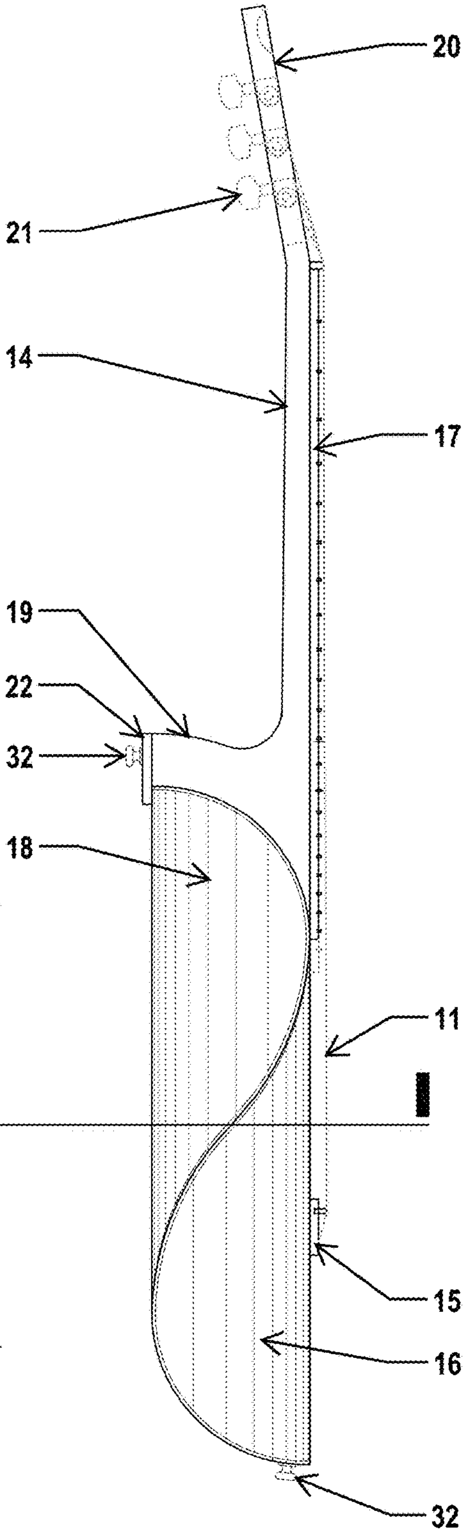
FIG. 3 is a side elevational view of the guitar of FIG. 1.

In FIGS. 1-3, the soundbox 12 comprises a soundhole 13 and an applied bridge 15 at the front soundboard 16. In this configuration, the strings 11 are attached to the bridge and extend above the neck member 14 and its fretboard 17 to terminate at the headstock 20 and tuners 21. In other embodiments of the present disclosure, the examples and configurations shown for the headstock, soundhole, bridge, and other elements may vary.

FIG. 2 and FIG. 3 present front and side elevational views, respectively, of the present disclosure, illustrating the curvature of the soundboard 16 and backboard 18 panels and the interconnection of these two curved panels to create the soundbox 12 without the use of side walls. In one more embodiments, the neck member 14 meets the soundbox 12 via an extended heel 19. In one or more embodiments where the neck member is removable, the heel is capped with a heel plate 22 that hooks over the end of the soundbox for positive attachment. In one or more embodiments, the heel could be configured differently where the neck member is fixed to the body.

Figure 4:
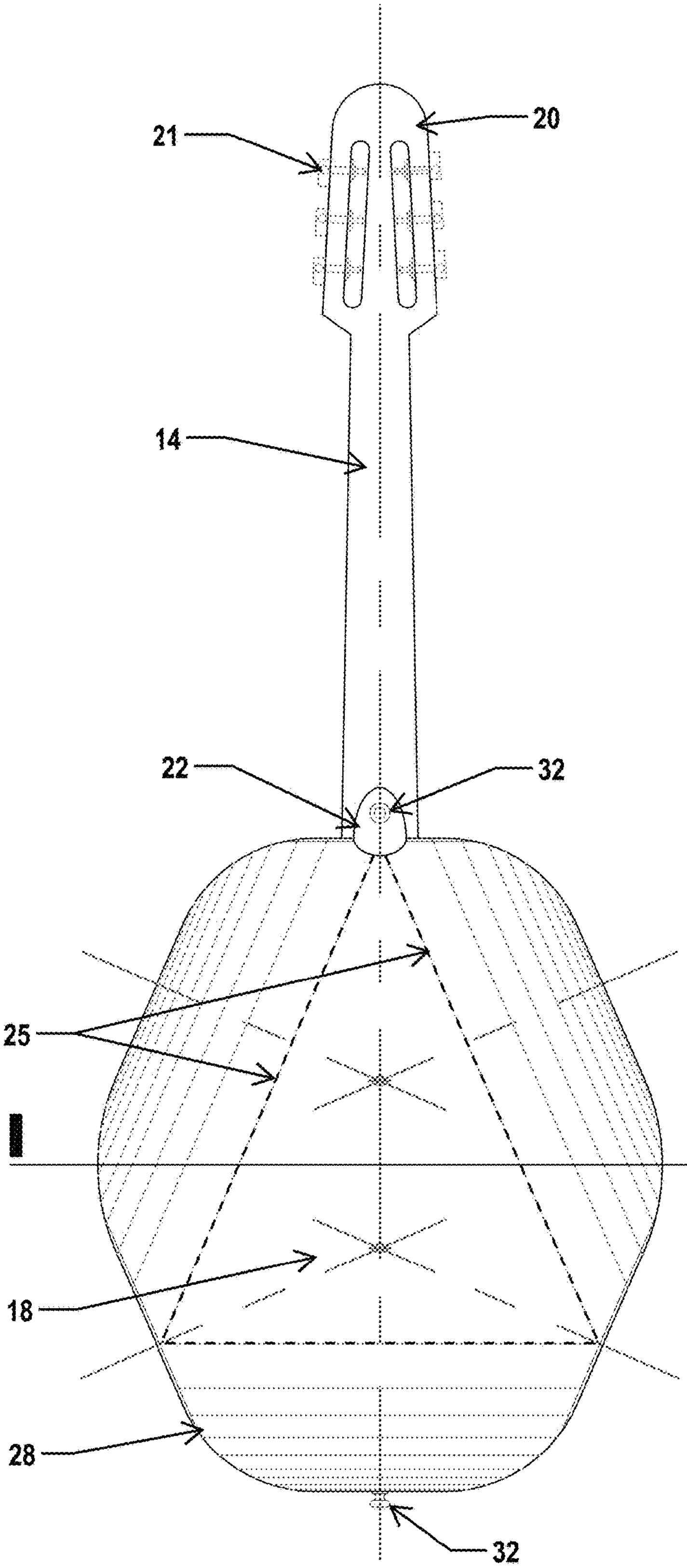
FIG. 4 is a rear elevational view of the guitar of FIG. 1.
Figure 9:
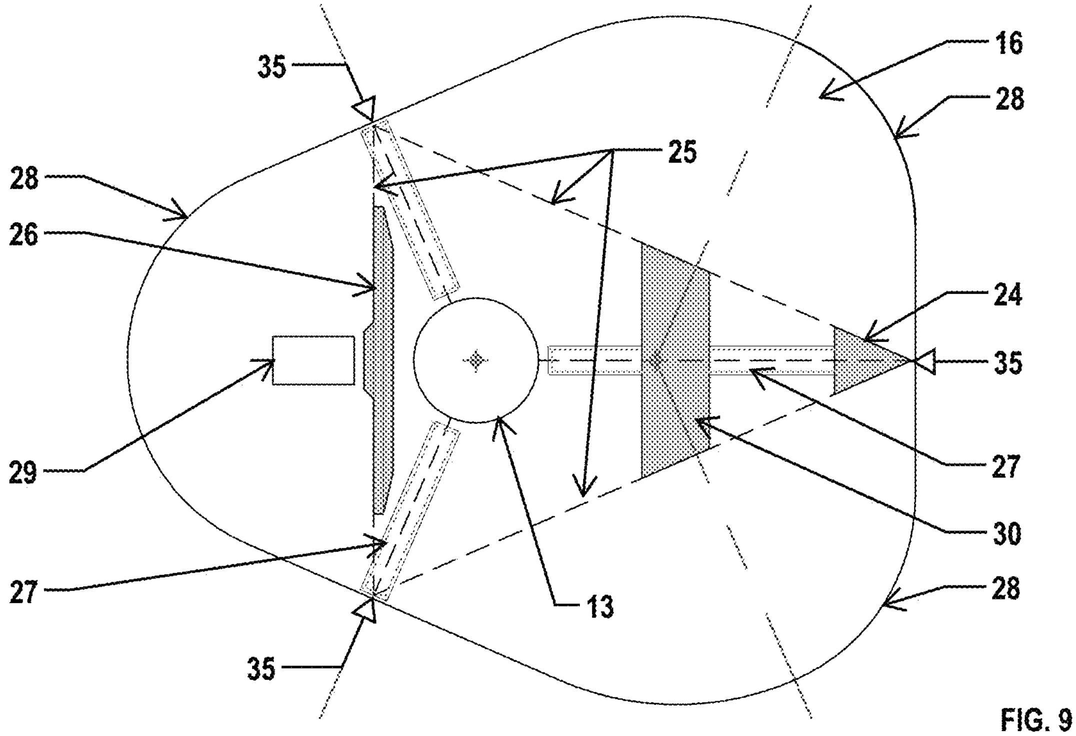
FIG. 9 is a plan view of the interior face of the soundbox top panel or soundboard, laid flat.
Figure 10A:
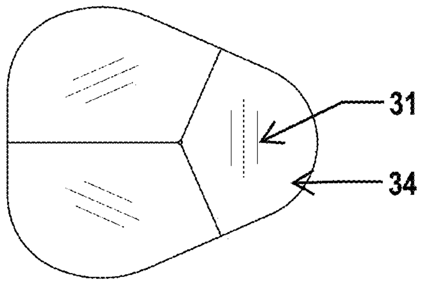
FIG. 10A is a diagrammatic plan view of a typical soundboard or backboard panel constructed from material necessitating the use of three pieces with different grain orientations.
Figure 10:
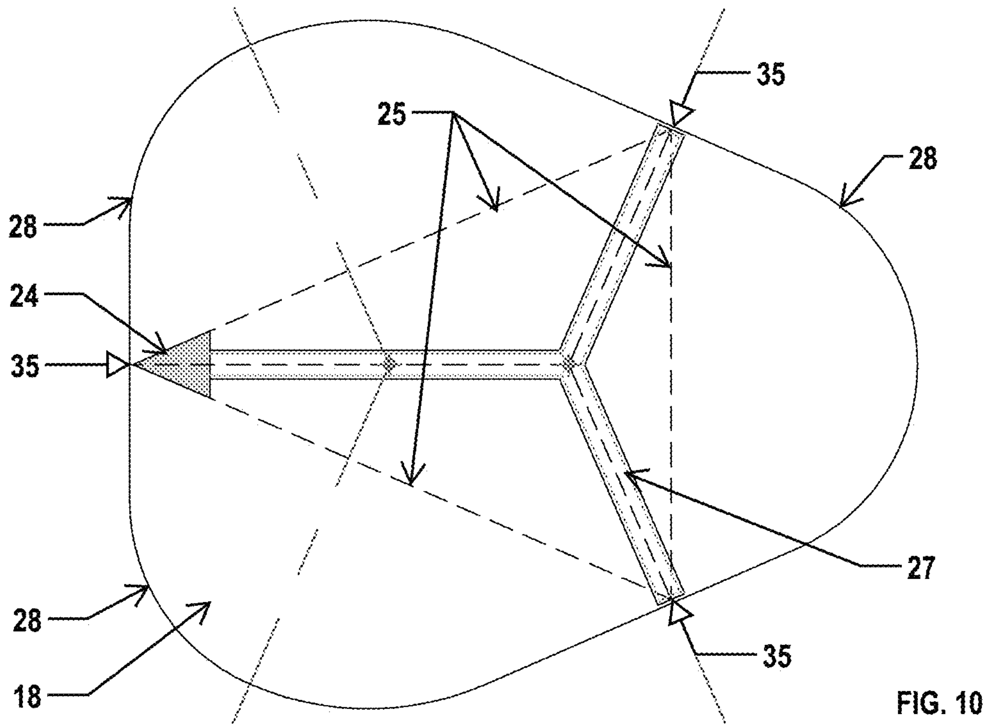
FIG. 10 is a plan view of the interior face of the soundbox back panel or backboard, laid flat.
Figure 11:
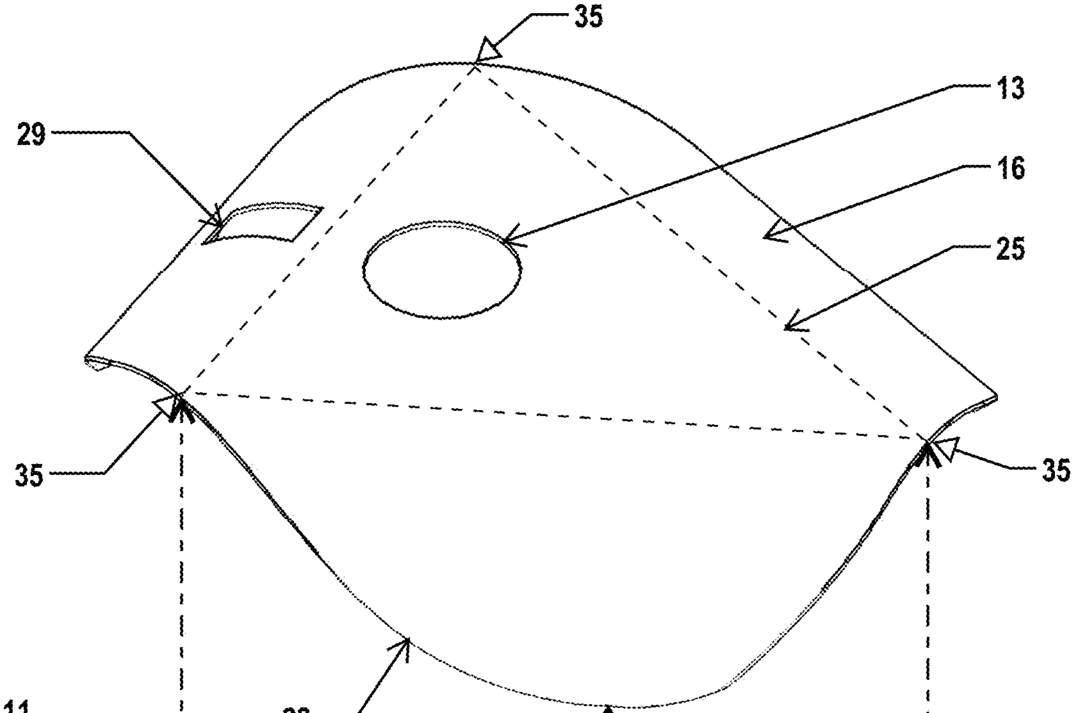
FIG. 11 is a perspective view of the soundboard panel, with curvature for interconnection with the matching backboard panel.
Figure 12:
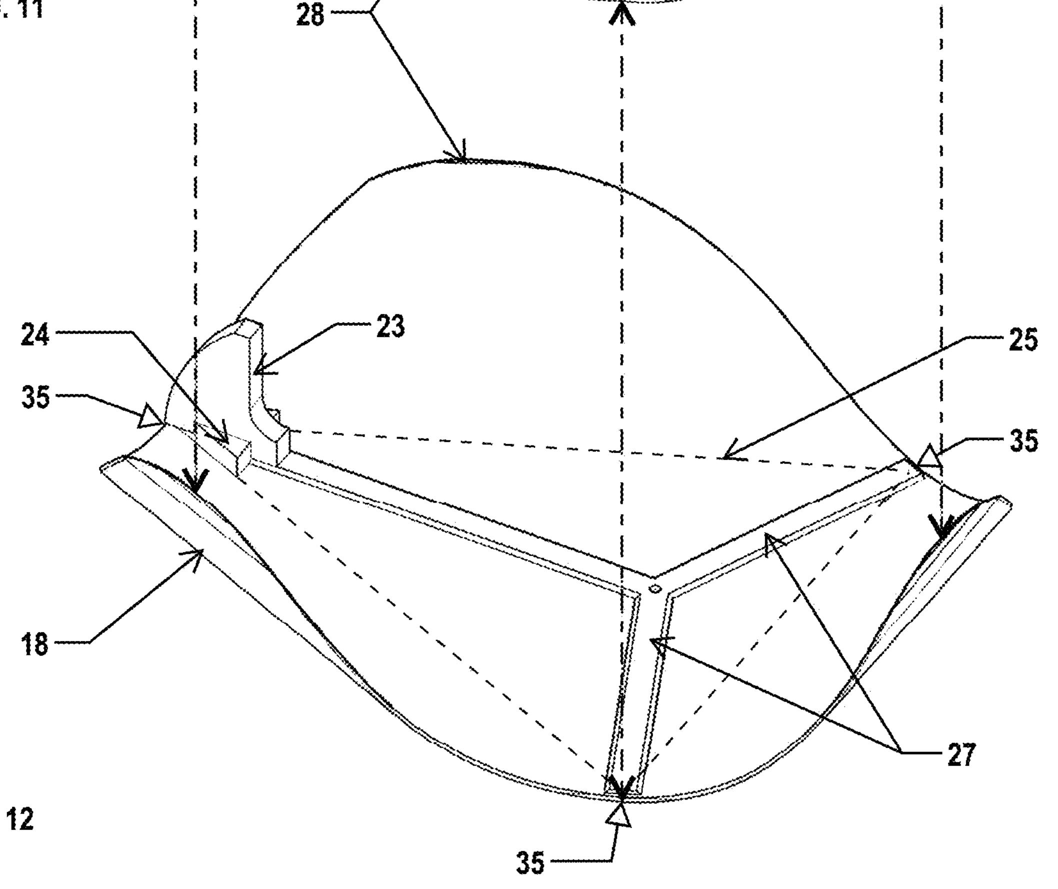
FIG. 12 is a perspective view of the backboard panel, with curvature for interconnection with the matching soundboard panel.

FIG. 4 presents a rear elevational view of the present disclosure. Dashed lines 25 delineate the boundary of the flat central surface of the backboard panel 18, with the remainder of the panel being curved, as shown. The front soundboard panel 16 may be similarly configured. Referring to FIG. 9 and FIG. 10, the soundboard panel 16 and backboard panel 18 are generally triangular in shape, with three rounded lobes 28 arranged about the triangular flat central surface indicated by the dashed lines 25. Each lobe 28 is curved parallel to the nearest side of the central triangle. As noted previously, introducing curvature into a flat plane creates strength along the axis of the curve. Therefore, introducing three curves in this triangular arrangement creates three axes of strength that converge at the corners of the triangle, providing considerable inherent reinforcement to these "strong points" 35. As shown in FIG. 11 and FIG. 12, when the soundboard and backboard shells are curved, interconnected, and assembled, the strong points 35 of each shell correspond with and connect to the curved lobes of the opposite shell so that they reinforce and strengthen the other, creating a thin monocoque or stressed-skin structural shell.

Figure 5:
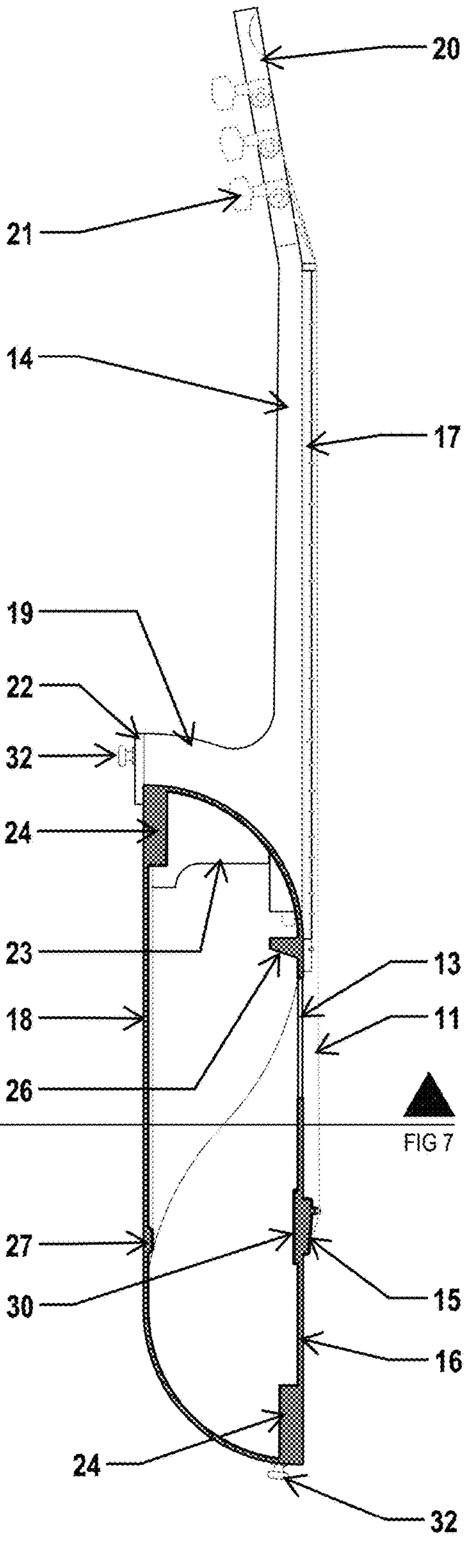
FIG. 5 is a longitudinal sectional view of the guitar of FIG. 1, cut adjacent to the guitar neck.

FIG. 5 presents a longitudinal sectional view of the present disclosure showing the absence of internal bracing with the exception of an internal heel block 23 to stiffen the soundboard shell 14 to resist deformation from the neck member, as well as a single top brace 26 that resists the tendency of the neck member to rotate due to string tension and transfers that structural load to the corners of the triangle 25 where the soundbox shell 12 is strongest.

Figure 6:
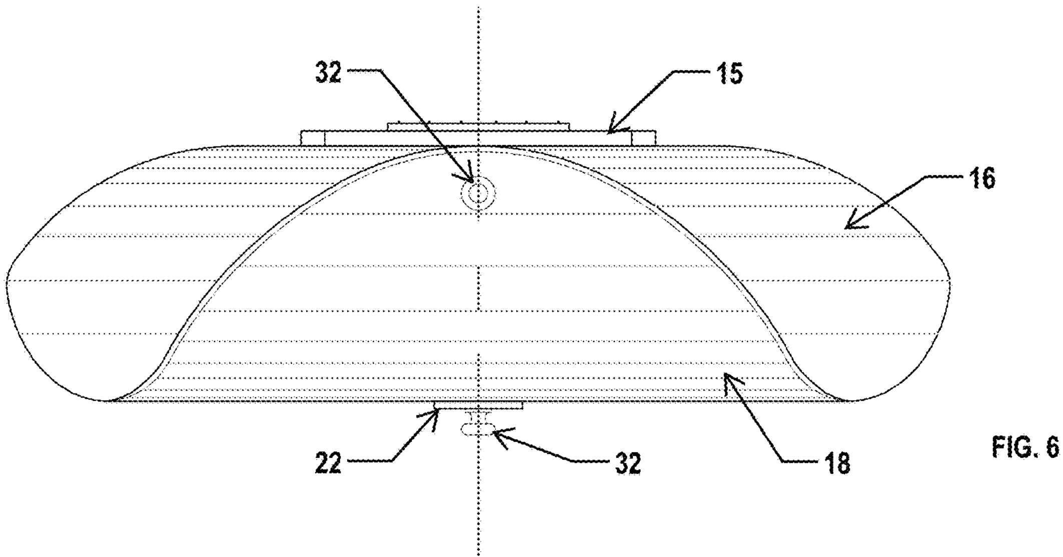
FIG. 6 is a bottom elevational view of the guitar of FIG. 1.

FIG. 6 presents an elevational view of the bottom end of the present disclosure, showing the interconnection of the soundboard 16 and backboard 18 and the locations of buttons 32 for the attachment of a shoulder strap if desired.

Figure 7:
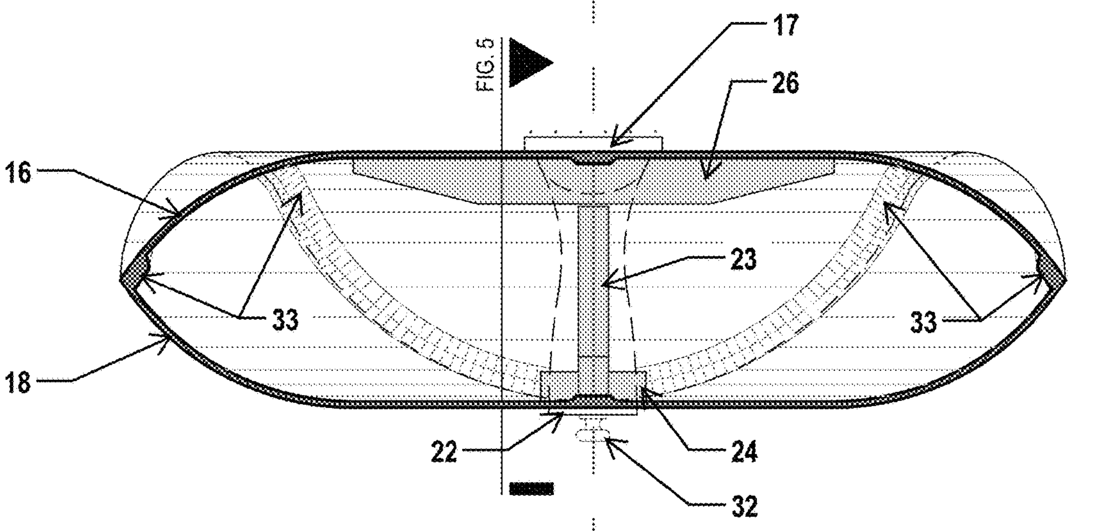
FIG. 7 is a transverse sectional view of the guitar of FIG. 1, cut through the centerline of the soundbox, facing towards the top of the soundbox.

FIG. 7 presents a cross-sectional view of the present disclosure showing the continuous kerfing strip 33 that reinforces the joint between the soundboard 16 and backboard 18, as well as an internal heel block 23 that buttresses the soundboard where it meets the neck member. A single transverse brace 26 transfers additional loads from the neck member to parts of the soundbox that are better able to resist those loads.

Figure 8:
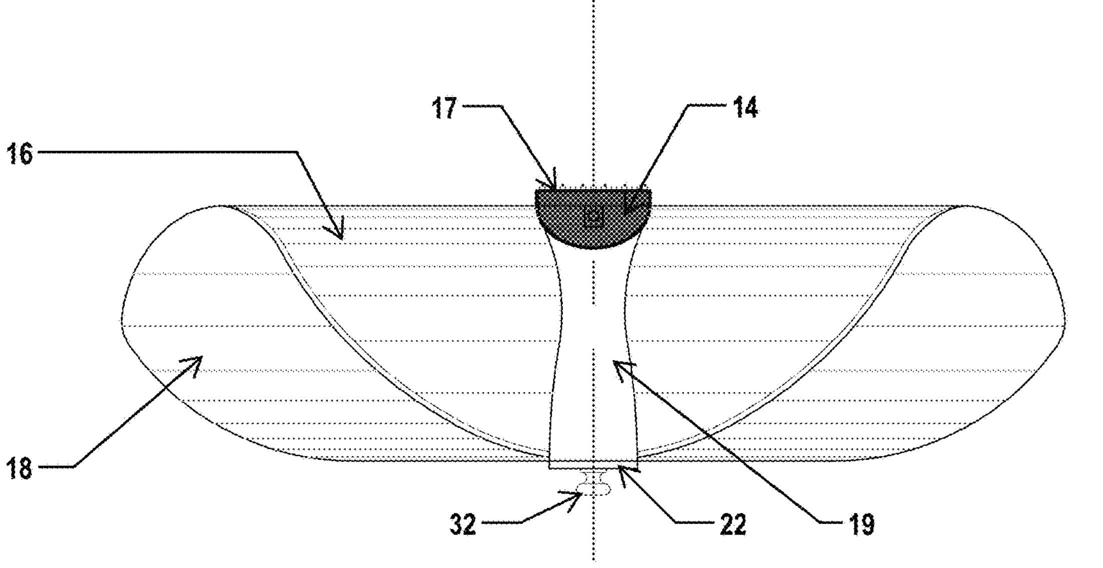
FIG. 8 is a transverse sectional view of the guitar of FIG. 1, cut through the neck and viewing the top of the soundbox.

FIG. 8 presents an elevational view of the top of the soundbox and a sectional view of the neck assembly of the present disclosure, showing the interconnection of the soundboard 16 and backboard 18 and the relationship to the neck member and heel 19 that hooks over the edge of the soundbox via the heel plate 22. The neck member 14 includes a conventional truss rod recessed into the neck member and concealed under the fretboard 17.

Returning to FIG. 9 and FIG. 10, the plan views of the interior faces of the soundboard 16 and backboard 18 show the arrangement of supplemental reinforcement. If the soundboard and backboard are fabricated from a material, such as wood, that has a directional grain, the grain would only allow curvature in one direction, and would resist curving in the three different directions to form both the soundboard and backboard. In that case, the soundboard and backboard must each be assembled from three pieces 34, with each piece oriented so that the grain direction 31 allows the desired curvature, as shown in FIG. 10A. The joints between these pieces 34 are reinforced with thin wood reinforcing strips 27. If the soundboard and backboard are constructed of a material that allows curvature in multiple directions, then the panel can be fabricated as a single piece, and the joint reinforcing strips 27 may not be required.

FIG. 9 illustrates the interior face of the soundboard 16 as it would appear laid flat, without curvature. In addition to the joint reinforcing strips 27 noted above, a thin wood plate 30 is provided to reinforce the soundboard beneath the bridge 15. A triangular wood block 24 is provided to reinforce a critical "strong point" 35 connection between the sound-board and backboard shells when assembled. A single brace 26 is provided to receive tensile string loads from the neck member 17 and heel 19 and transfer those loads to the other two "strong points" 35 where the geometry of the soundbox provides inherent strength. In this manifestation of the disclosure, a rectangular opening 29 is provided to receive a portion of the neck member 17, which is removable. In alternative manifestations that utilize a fixed neck member, this opening might not be required or might be configured differently.

FIG. 10 illustrates the interior face of the backboard 18 as it would appear laid flat, without curvature. In addition to the joint reinforcing strips 27 noted above, a triangular wood block 24 is provided to reinforce a critical "strong point" 35 and to anchor a heel block 23 that is provided to support the soundboard 16 to resist loads from the neck member 17 and heel block 18. The configuration of the heel block may vary as desired for different neck attachment options.

As noted previously, FIG. 11 and FIG. 12 illustrate the manner in which the soundboard 16 and backboard 18 are curved and interconnected, and how the strong points 35 of each shell correspond with the ends of the curved lobes to create the soundbox 12.

According to the aforementioned example embodiments, it may be advantageous to configure a soundboard so that bracing can be largely eliminated while also not requiring thicker material for the soundboard faces; with curved edges that allow for more comfortable playing positions; and with a curved surface where the neck joins the soundbox body, making a cutaway unnecessary and allowing both left- and right-handed players equal access to the lower frets.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed:

1. A stringed musical instrument, comprising:
- a soundbox, comprising a soundboard and a backboard opposite the soundboard, wherein the soundboard is configured to directly connect to the backboard without sidewalls to form a sound chamber;
- a headstock, comprising tuners;
- a neck member, comprising a fretboard, extending between the headstock and the soundbox to form a common longitudinal axis;
- a plurality of strings having ends coupled to the tuners and other ends coupled to the soundbox; and
- a bridge coupled to the soundbox along the longitudinal axis, wherein ends of the strings are connected to the bridge or to a separate tailpiece, and other ends of the strings are connected to the tuners.

2. The stringed musical instrument of claim 1, wherein the soundbox further comprises one or more soundholes, and the bridge and tuners reside on or substantially parallel to the longitudinal axis of the neck member and the soundbox.

3. The stringed musical instrument of claim 1, wherein each of the soundboard and the backboard is configured to have a triangular planar surface with each side of the triangular planar surface having a curved surface extending therefrom.

4. The stringed musical instrument of claim 1, wherein the soundboard and the backboard are each formed of materials including, at least, one of solid tonewood, multi-ply laminated wood, resin-impregnated fiberglass fabric, metal, plastic, or any combination thereof.

5. The stringed musical instrument of claim 1, wherein the soundboard and the backboard are each formed of one or more materials configured to curve into multiple different axes.

6. The stringed musical instrument of claim 1,
- wherein the soundboard and the backboard, or portions thereof, are each formed of multiple pieces, and each of the multiple pieces of the soundboard and the backboard has a different material grain orientation with each corresponding with a single axis of curvature.

7. A stringed musical instrument, comprising:
- a soundbox, comprising a soundboard and a backboard opposite the soundboard, wherein the soundboard is configured to directly connect to the backboard to form a sound chamber;
- a headstock, comprising tuners;
- a neck member, comprising a fretboard, extending between the headstock and the soundbox to form a common longitudinal axis;
- a plurality of strings having ends coupled to the tuners and other ends coupled to the soundbox; and a bridge coupled to the soundbox along the longitudinal axis, wherein ends of the strings are connected to the bridge or to a separate tailpiece, and other ends of the strings are connected to the tuners, wherein the soundboard and the backboard, or portions thereof, are each formed of one or multiple pieces that are capable of forming or bending in multiple different axes of curvature.

8. The stringed musical instrument of claim 1, wherein the neck member is removably connected to the soundbox by a tenon configured to engage a slot in the soundboard and a clip at a heel of the neck member that hooks over an edge of the backboard.

9. The stringed musical instrument of claim 1, wherein the neck member is fixedly coupled to the soundbox.

10. A stringed musical instrument, comprising:

a soundbox, comprising a soundboard and a backboard opposite the soundboard, wherein the soundboard is configured to directly connect to the backboard to form a sound chamber, and the soundboard has a triangular planar surface with sides of the triangular planar surface having curved surfaces extending therefrom into different axes;

a headstock, comprising tuners;

a neck member, comprising a fretboard, extending between the headstock and the soundbox to form a common longitudinal axis; and a bridge coupled to the soundbox along the longitudinal axis, wherein ends of a plurality of strings are connected to the bridge and other ends of the strings are connected to the tuners.

11. The stringed musical instrument of claim 10, wherein the soundboard and the backboard, or portions thereof, are each formed of materials including, at least one of solid tonewood, multi-ply laminated wood, resin-impregnated fiberglass fabric, metal, plastic, or any combination thereof.

12. The stringed musical instrument of claim 10, wherein the soundboard and the backboard are each formed of one or more materials configured to curve into multiple different axes.

13. The stringed musical instrument of claim 10, wherein the soundboard and the backboard, or portions thereof, are each formed of multiple pieces, and each of the multiple pieces of the soundboard has a different material grain orientation with each corresponding with a single axis of curvature.

14. The stringed musical instrument of claim 10, wherein the soundboard and the backboard, or portions thereof, are each formed of one or multiple pieces that are capable of forming or bending in multiple different axes of curvature.

15. The stringed musical instrument of claim 10, wherein the neck member is removably connected to the soundbox by a tenon configured to engage a slot in the soundboard and a clip at a heel of the neck member that hooks over an edge of the backboard.

16. The stringed musical instrument of claim 10, wherein the neck member is fixedly coupled to the soundbox.

17. The stringed musical instrument of claim 10, wherein the strings are six in number.

* * * * *